(12) United States Patent
Lin

(10) Patent No.: US 12,681,531 B2
(45) Date of Patent: Jul. 14, 2026

(54) TABLET COMPUTER PROTECTIVE CASE DEVICE

(71) Applicant: Sunnylove Technology Company Limited, Taipei City (TW)

(72) Inventor: Kuo-Yuan Lin, Taipei City (TW)

(73) Assignee: Sunnylove Technology Company Limited, Taipei City (TW)

( * ) Notice: Subject to any disclaimer, the term of this patent is extended or adjusted under 35 U.S.C. 154(b) by 0 days.

(21) Appl. No.: 19/260,951

(22) Filed: Jul. 7, 2025

(65) Prior Publication Data

US 2026/0086601 A1 Mar. 26, 2026

(30) Foreign Application Priority Data

Sep. 23, 2024 (TW) ................................. 113136038

(51) Int. Cl.
| | |
|---|---|
| *H01R 3/00* | (2006.01) |
| *G06F 1/16* | (2006.01) |
| *G06F 3/02* | (2006.01) |
| *H02J 7/70* | (2026.01) |

(52) U.S. Cl.
CPC .......... *G06F 1/1629* (2025.01); *G06F 3/0202* (2013.01); *H02J 7/731* (2026.01)

(58) Field of Classification Search
CPC .............................................. G06F 2200/1633
See application file for complete search history.

(56) References Cited

U.S. PATENT DOCUMENTS

| | | | | |
|---|---|---|---|---|
| 2011/0284420 | A1* | 11/2011 | Sajid ..................... | G06F 3/0202 |
| | | | | 206/576 |
| 2012/0140393 | A1* | 6/2012 | Lan ....................... | G06F 1/1626 |
| | | | | 361/679.02 |
| 2015/0244126 | A1* | 8/2015 | Carnevali ............. | G06F 1/1628 |
| | | | | 439/527 |
| 2015/0349578 | A1* | 12/2015 | Hu .......................... | H01F 38/14 |
| | | | | 320/108 |
| 2025/0044832 | A1* | 2/2025 | Wagner ................... | G06F 1/189 |

FOREIGN PATENT DOCUMENTS

| | | |
|---|---|---|
| CN | 116247766 A | 6/2023 |
| TW | M408268 U | 8/2011 |

* cited by examiner

*Primary Examiner* — Nan-Ying Yang
(74) *Attorney, Agent, or Firm* — Best & Flanagan LLP

(57) ABSTRACT

A tablet computer protective case device is used for storing a tablet computer, and the tablet computer includes a tablet female connector. The tablet computer protective case device includes a protective case body. The protective case body includes a main plane plate, a side wall plate, a conductive connecting wire and an accommodation space. The side wall plate is connected around the main plane plate, wherein the side wall plate includes a male connector, and the male connector is used for connecting to the tablet female connector. The conductive connecting wire is used for connecting to the male connector. The accommodation space is formed by the main plane plate and the side wall plate, to store the tablet computer.

8 Claims, 8 Drawing Sheets

TABLET COMPUTER PROTECTIVE CASE DEVICE

CROSS REFERENCE TO RELATED APPLICATIONS

This application claims priority of Application No. 113136038 filed in Taiwan on Sep. 23, 2024 under 35 U.S.C. § 119, the entire content is hereby incorporated by reference.

BACKGROUND OF THE INVENTION

1. Field of the Invention

The present invention relates to a tablet computer protective case device, especially to a tablet computer protective case device that can electrically connect to other devices via a wired connection to provide power.

2. Description of the Related Art

A tablet computer is a highly popular portable personal computer characterized by a touch screen interface for user operation. Due to the convenience of carrying a tablet computer, manufacturers have produced protective cases for tablet computers to prevent damage from collisions during transport. Additionally, some tablet computer protective cases come with external keyboards, which have Bluetooth functionality. Users can enable the Bluetooth wireless connection feature on the tablet computer and connect wirelessly to the external keyboard, allowing the tablet computer and external keyboard to be wirelessly operated together for the users.

However, it is known that tablet computer protective cases with keyboards often require additional power supply for the keyboard, such as installing extra batteries in the keyboard or attaching external charging cables, which increases production costs. Additionally, due to the instability of Bluetooth connections, disconnections sometimes occur, causing inconvenience to users.

Therefore, providing a tablet computer protective case that can solve the above issues has become a topic worth exploring.

SUMMARY OF THE INVENTION

The primary objective of the present invention is to provide a tablet computer protective case device that can be electrically connected to other devices via a wired connection for power supply.

To achieve the aforementioned purpose, the tablet computer protective case device of the present invention is used for accommodating a tablet computer, which includes a tablet female connector. The tablet computer protective case device includes a protective case body. The protective case body includes a main plane plate, a side wall plate, a conductive connecting wire, and an accommodation space. The side wall plate is connected to the main plane plate around, wherein the side wall plate includes a male connector, which is used for connecting to the tablet female connector. The conductive connecting wire is used for connecting to the male connector. The accommodation space is formed by the main plane plate and the side wall plate, to accommodate the tablet computer.

According to one embodiment of the present invention, the side wall plate includes a gap, wherein the gap is located next to the male connector, allowing the side wall plate to form a connection strip; wherein an opening end of the connection strip is connected to the male connector, allowing the male connector to be inserted into the tablet female connector or to be separated from the tablet female connector through the connection strip.

According to one embodiment of the present invention, the tablet computer protective case device further includes a keyboard. The keyboard includes a plurality of buttons, a keyboard circuit board and a plurality of keyboard electrical contacting points, wherein the plurality of buttons are electrically connected to the keyboard circuit board, the plurality of keyboard electrical contacting points are electrically connected to the keyboard circuit board. The side wall plate further includes a plurality of protection case electrical contacting points, the plurality of protection case electrical contacting points are located on a bottom side of the side wall plate, the plurality of protection case electrical contacting points are electrically connected to the conductive connecting wire; whereby, allowing the plurality of protection case electrical contacting points to be electrically connected to the plurality of keyboard electrical contacting points, allowing the keyboard to be connected to the tablet computer via a wired method.

According to one embodiment of the present invention, wherein the keyboard further includes a keyboard female connector, and the keyboard female connector is electrically connected to the keyboard circuit board.

According to one embodiment of the present invention, wherein the keyboard female connector and the tablet female connector belong to the same type of female connector.

According to one embodiment of the present invention, wherein the keyboard female connector and the tablet female connector are TYPE-C female connectors.

According to one embodiment of the present invention, wherein the side wall plate further includes a wireless charging module, and the wireless charging module is electrically connected to the conductive connecting wire.

According to one embodiment of the present invention, wherein the side wall plate further includes a touch pen holder, and the touch pen holder is located on an outer side of the wireless charging module; whereby, the touch pen holder is used for storing a touch pen, and when the touch pen is placed in the touch pen holder, a wireless charging is performed.

DETAILED DESCRIPTION OF THE PREFERRED EMBODIMENT

To better understand the technical content of the present invention, a preferred specific embodiment is described as follows.

Figure 1:
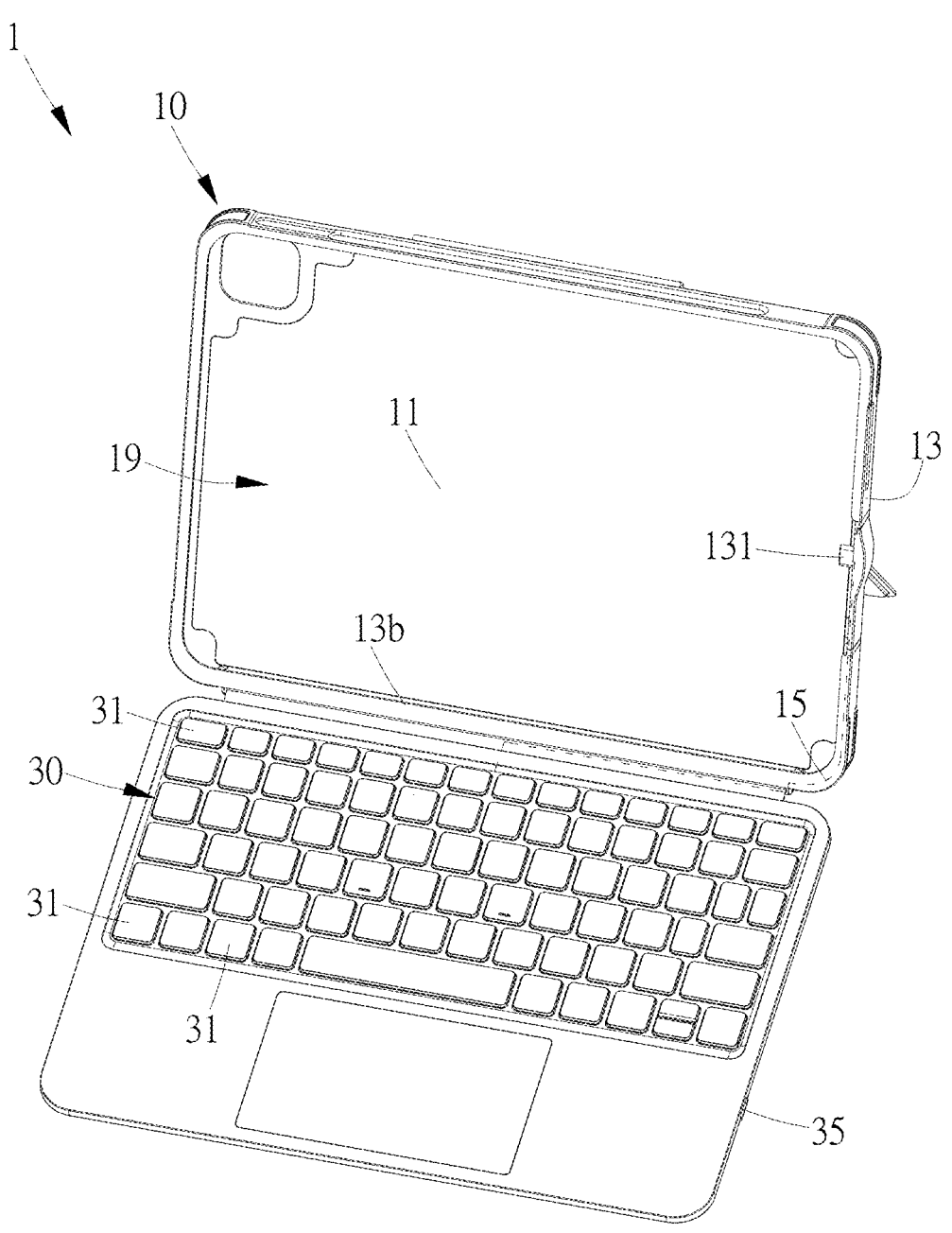
FIG. 1 is a schematic diagram of the tablet computer protective case device of the first embodiment of the present invention.
Figure 2:
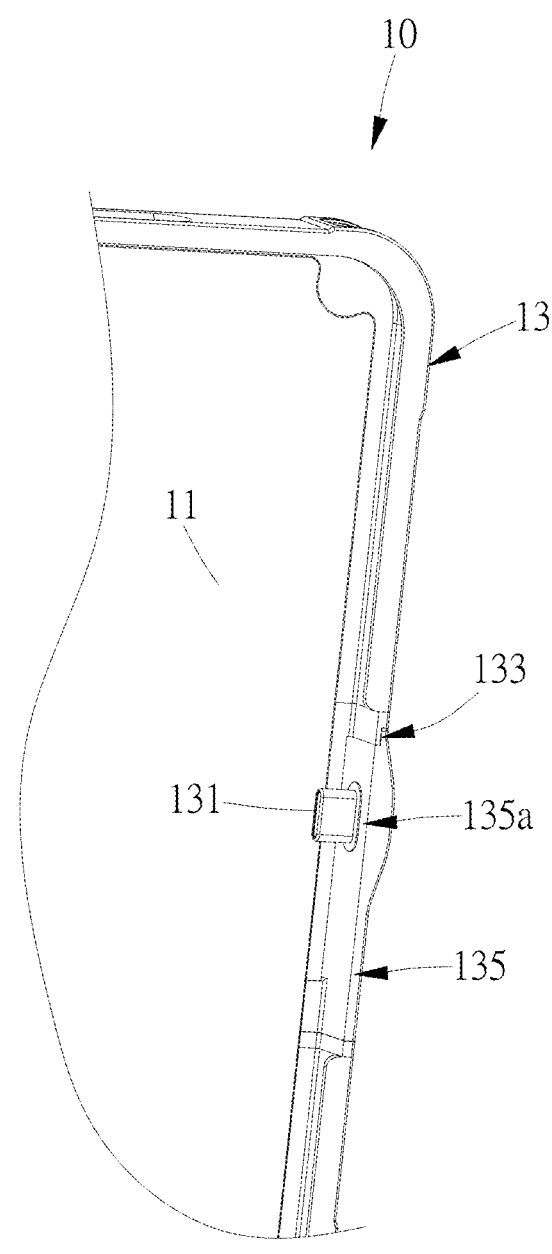
FIG. 2 is a partial enlarged view of the side wall plate of the opening end when closed according to the first embodiment of the present invention.
Figure 3:
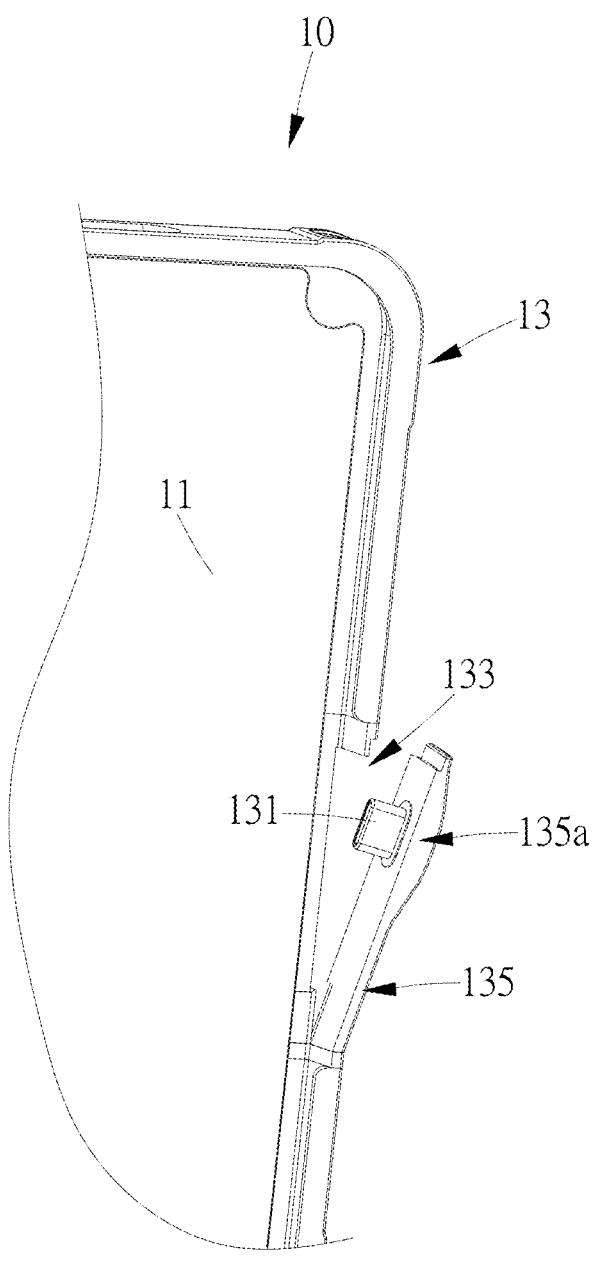
FIG. 3 is a partial enlarged view of the side wall plate of the opening end when opened according to the first embodiment of the present invention.
Figure 4:
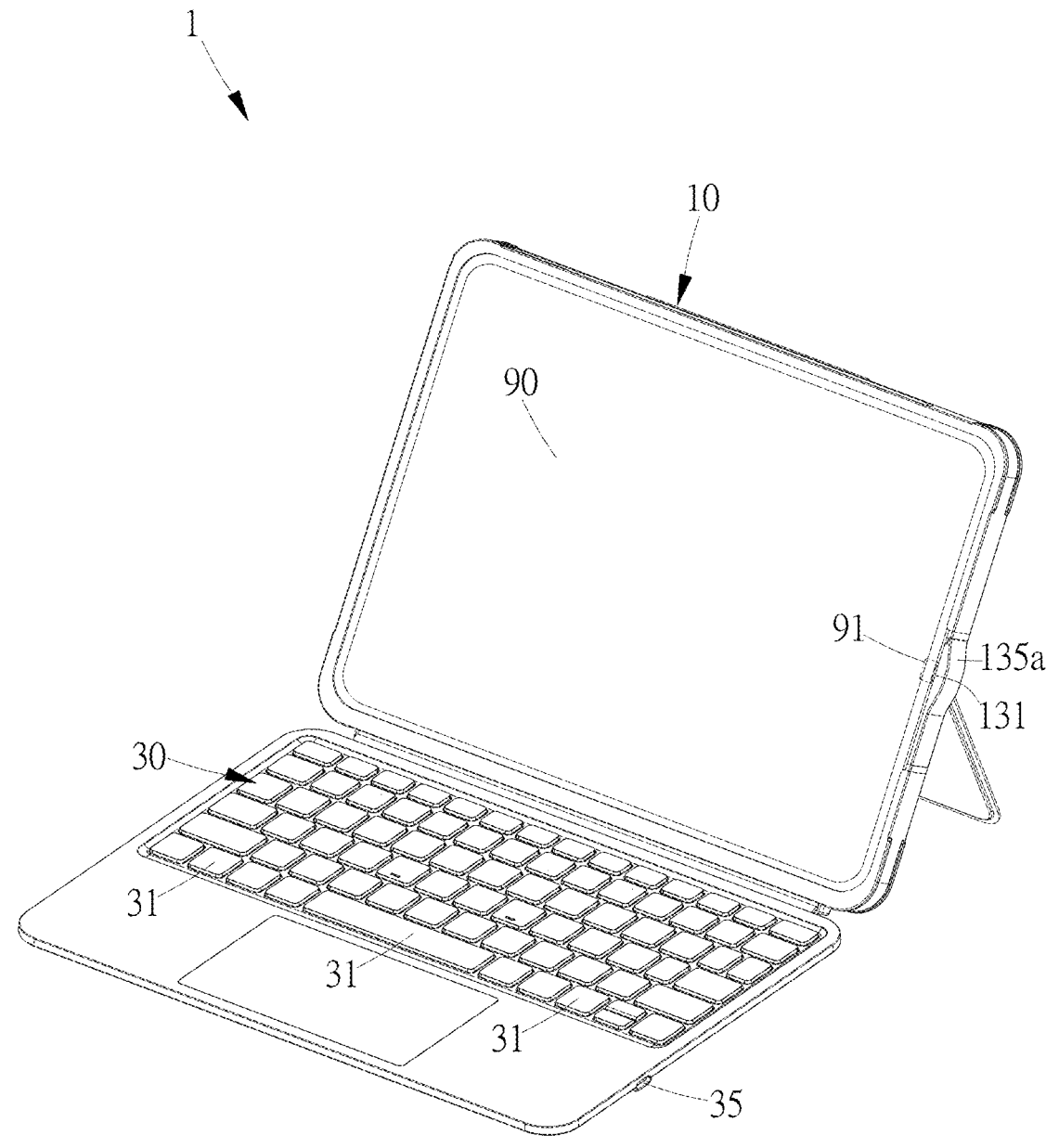
FIG. 4 is a schematic diagram of the tablet computer inserted into the tablet computer protective case device according to the first embodiment of the present invention.
Figure 4A:
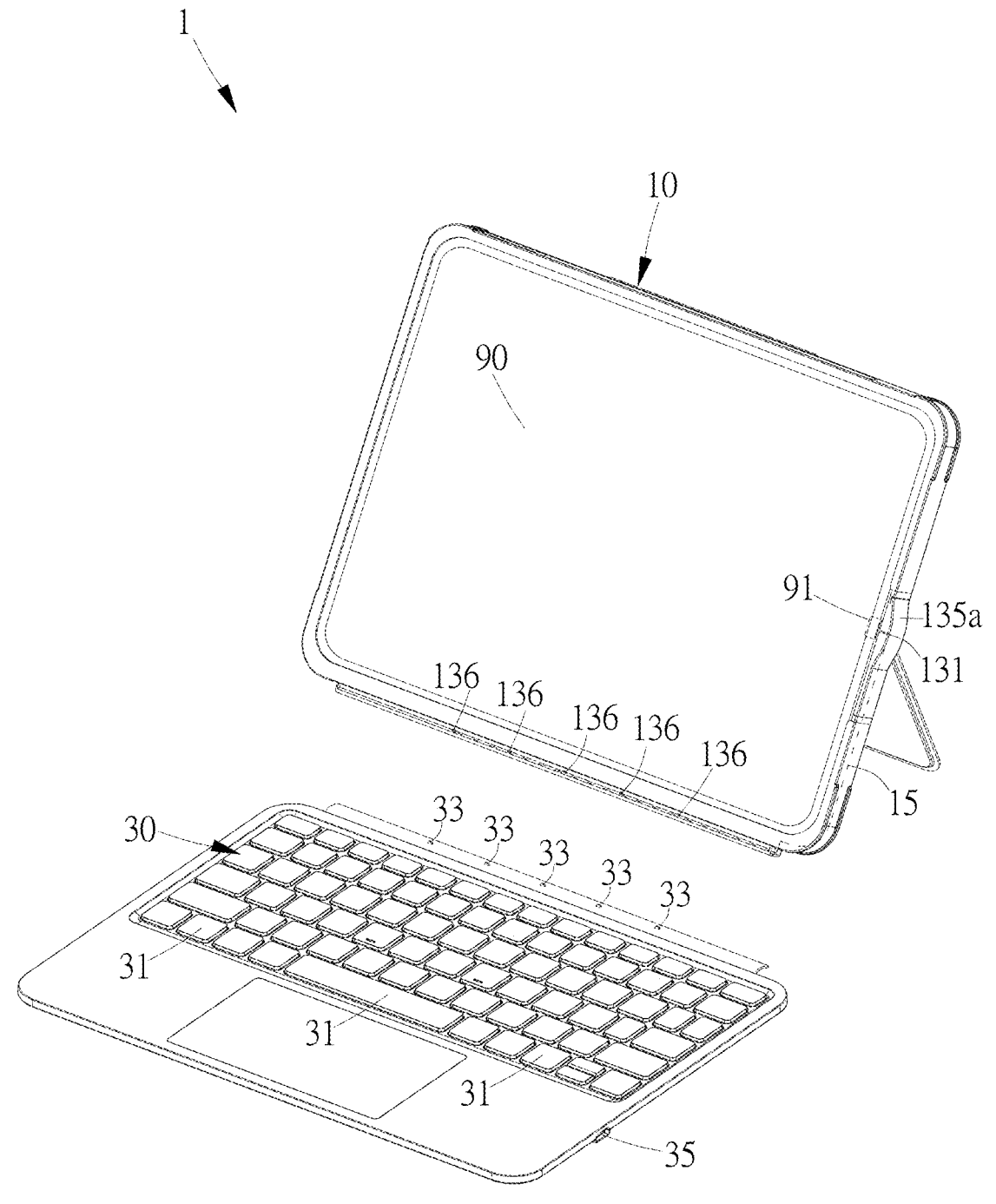
FIG. 4a is a schematic diagram of the tablet computer protective case device with the separating keyboard and protective case body according to the first embodiment of the present invention.
Figure 5:
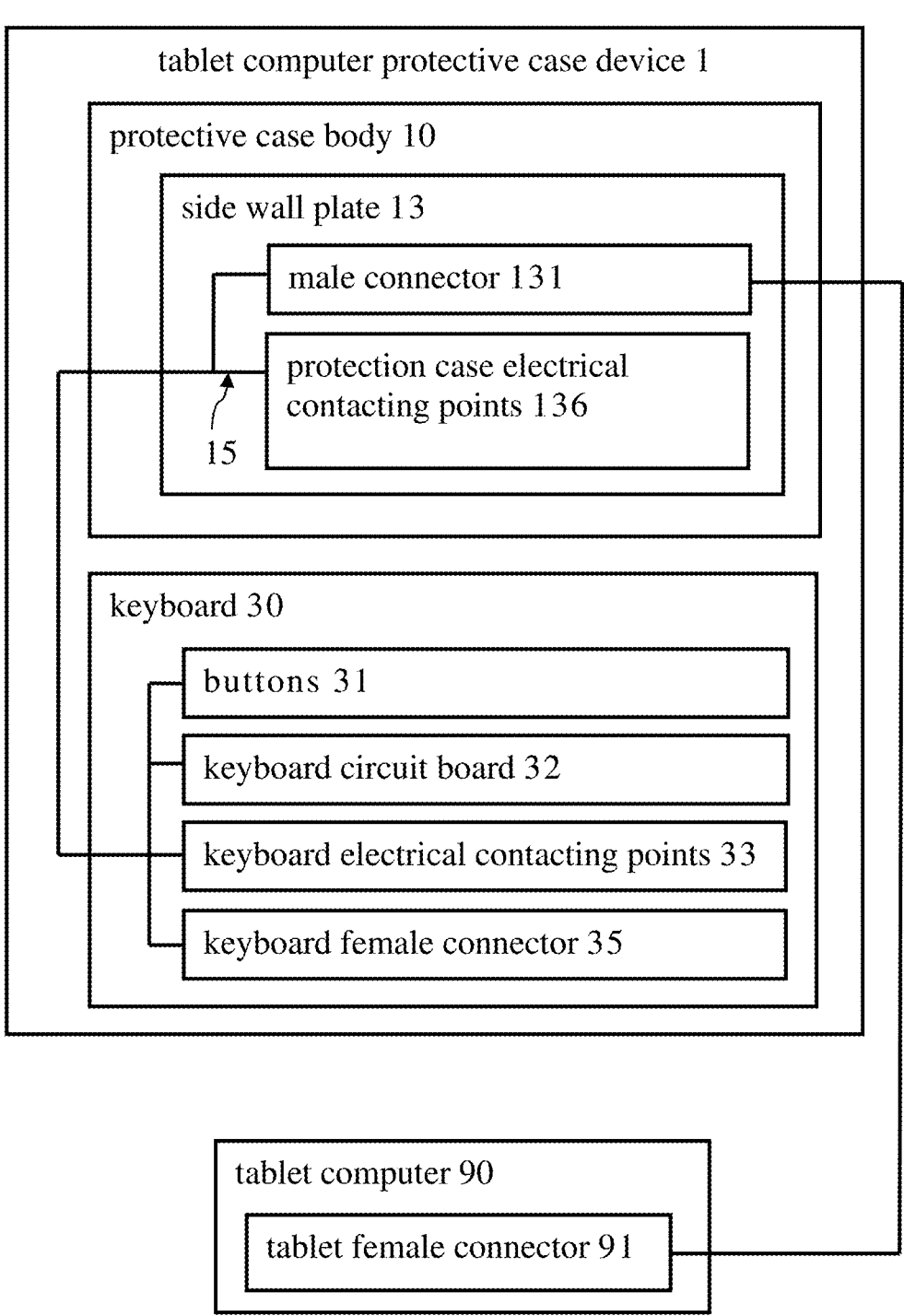
FIG. 5 is a system structure diagram of the tablet computer and tablet computer protective case device according to the first embodiment of the present invention.

With reference to FIGS. 1 to 5, which illustrate the tablet computer protective case device according to the first embodiment of the present invention. FIG. 1 is a schematic diagram of the tablet computer protective case device of the first embodiment of the present invention. FIG. 2 is a partial enlarged view of the side wall plate of the opening end when closed according to the first embodiment of the present invention. FIG. 3 is a partial enlarged view of the side wall plate of the opening end when opened according to the first embodiment of the present invention. FIG. 4 is a schematic diagram of the tablet computer inserted into the tablet computer protective case device according to the first embodiment of the present invention. FIG. 4a is a schematic diagram of the tablet computer protective case device with the separating keyboard and protective case body according to the first embodiment of the present invention. FIG. 5 is a system structure diagram of the tablet computer and tablet computer protective case device according to the first embodiment of the present invention.

As shown in FIG. 1 and FIG. 4, in the first embodiment of the present invention, the tablet computer protective case device 1 is used for accommodating a tablet computer 90, and the tablet computer 90 can be electrically connected to other devices via a wired connection. The tablet computer 90 includes a tablet female connector 91, and the tablet female connector 91, for example, is a TYPE-C female connector. The tablet computer protective case device 1 includes a protective case body 10 and a keyboard 30.

As shown in FIGS. 1 to 4a, in the first embodiment of the present invention, the protective case body 10 is a protective case whose shape is corresponded to the tablet computer 90, and is used for surrounding and covering the tablet computer 90 to provide a protection function. The protective case body 10 includes a main plane plate 11, a side wall plate 13, a conductive connecting wire 15, and an accommodation space 19. The main plane plate 11 is the bottom panel body of the protective case body 10, used for covering the back of the tablet computer 90. The side wall plate 13 is made of flexible materials such as silicone or rubber, and the side wall plate 13 is the side ring panel body of the protective case body 10, used for covering the sides of the tablet computer 90. The side wall plate 13 is connected around the main plane plate 11, and the side wall plate 13 includes a male connector 131, a gap 133, and a plurality of protection case electrical contacting points 136.

The male connector 131 is a TYPE-C male connector, used for connecting to the tablet female connector 91 to obtain power from the tablet computer 90. The gap 133 is located next to the male connector 131, and the gap 133 allows the side wall plate 13 and the main plane plate 11 to separate near the gap 133, to form a connection strip 135. The opening end 135a of the connection strip 135 is connected to the male connector 131. Due to the side wall plate 13 being made of flexible material, the connection strip 135 can straighten and fit into the gap 133 (as shown in FIG. 2), or the connection strip 135 can curve outward and leave the gap 133 (as shown in FIG. 3). Therefore, through straightening and fitting into the gap 133, the male connector 131 can be inserted into the tablet female connector 91 (as shown in FIG. 2 and FIG. 4); or through curving outward and leaving the gap 133, the male connector 131 can be detached from the tablet female connector 91. The benefit of curving outward for the connection strip 135 is that when the tablet computer protective case device 1 covers the tablet computer 90, the connection strip 135 can be curved first and then combined with the tablet female connector 91. Additionally, when the user uses the tablet computer 90 alone (without the keyboard 30), if the user wants to use the tablet female connector 91, the connection strip 135 can be curved outward to detach from the tablet female connector 91. The plurality of protection case electrical contacting points 136 are located on the bottom side 13b of the side wall plate 13, and the plurality of protection case electrical contacting points 136 are electrically connected to the conductive connecting wire 15. The plurality of protection case electrical contacting points 136 are used for forming an electrical connection with the keyboard 30. The protection case electrical contacting points 136 are conventional electrical switch contacts used for forming electrical connections between different electronic components. However, electrical contacts have been widely used in various electronic devices, and they are not the focus of this case, so they will not be elaborated here.

The conductive connecting wire 15 is a power cable formed by multiple conductors, and the conductive connecting wire 15 is connected to the male connector 131. Conductive connecting wire 15 is used for transmitting the power obtained from the tablet female connector 91 to other components. The conductive connecting wire 15 is placed inside the side wall plate 13, but the position of conductive connecting wire 15 is not limited to the above, it can also be placed inside the main plane plate 11. The accommodation space 19 is formed by the main plane plate 11 and the side wall plate 13, and the accommodation space 19 is used for accommodating the tablet computer 90.

As shown in FIG. 1, FIG. 4 to FIG. 5, in the first embodiment of the present invention, the keyboard 30 can be combined with or separated from the protective case body 10 according to the usage needs. The keyboard 30 includes a plurality of buttons 31, a keyboard circuit board 32, a plurality of keyboard electrical contacting points 33, and a keyboard female connector 35. The plurality of buttons 31 are used for allowing the user to operate and input data. The plurality of buttons 31 are electrically connected to the keyboard circuit board 32, the keyboard circuit board 32 is used for receiving and processing the data input by the plurality of operating buttons 31 and forming electronic signals. The plurality of keyboard electrical contacting points 33 are electrically connected to the keyboard circuit board 32, and the plurality of protection case electrical contacting points 136 can be electrically connected to the plurality of keyboard electrical contacting points 33. The keyboard female connector 35 is electrically connected to the keyboard circuit board 32, and the keyboard female connector 35 and the tablet female connector 91 are of the same type of female connectors, which are TYPE-C female connectors. The keyboard female connector 35 is used to be inserted into an external device (such as a mouse, a flash drive); however, the types of connectors of the keyboard female connector 35 and the tablet female connector 91 are not limited to the above, and can be changed into other types of connectors according to the usage needs, such as a USB connector. The advantage of this design is that the power required by the keyboard 30 can be provided by the tablet computer 90. Since the tablet female connector 91 is occupied by the male connector 131, but due to the arrangement of the keyboard female connector 35, the user still has the keyboard female connector 35 to use. The side of the keyboard 30 corresponding to the protective case body 10 is provided with a tape that allows the keyboard 30 and the protective case body 10 to be combined, however, the tape structure is common knowledge in the field, and it is not the focus of this application, so it will not be elaborated here.

When the user wants to use the tablet computer protective case device 1 of the present invention, as shown in FIG. 1 and FIG. 4, the user can first place the tablet computer 90 into the accommodation space 19. Then, as shown in FIG. 2, FIG. 4, and FIG. 5, the user can straighten the connection strip 135 and fit it into the gap 133, allowing the male connector 131 to be inserted into the tablet female connector 91. When the male connector 131 is inserted into the tablet female connector 91, the power of the tablet computer 90 can be transmitted to the conductive connecting wire 15 and the plurality of protection case electrical contacting points 136 through the male connector 131. The power is then transmitted between the plurality of protection case electrical contacting points 136 and the plurality of keyboard electrical contacting points 33, allowing the power to be sent to the keyboard 30. Therefore, through the aforementioned structure, the plurality of protection case electrical contacting points 136 can be electrically connected to the plurality of keyboard electrical contacting points 33, allowing the keyboard 30 to be connected to the tablet computer 90 via the wired method. The keyboard 30 can also receive power from the tablet computer 90 via the wired method without the need to set up additional power sources. Additionally, when the user types on the keyboard 30, the keyboard circuit board 32 will receive and process the data input by the plurality of operating buttons 31 and form electronic signals. The electronic signals are then transmitted to the tablet computer 90 through the plurality of protection case electrical contacting points 136 and the plurality of keyboard electrical contacting points 33, allowing the screen of the tablet computer 90 to display the data input by the user.

Figure 6:
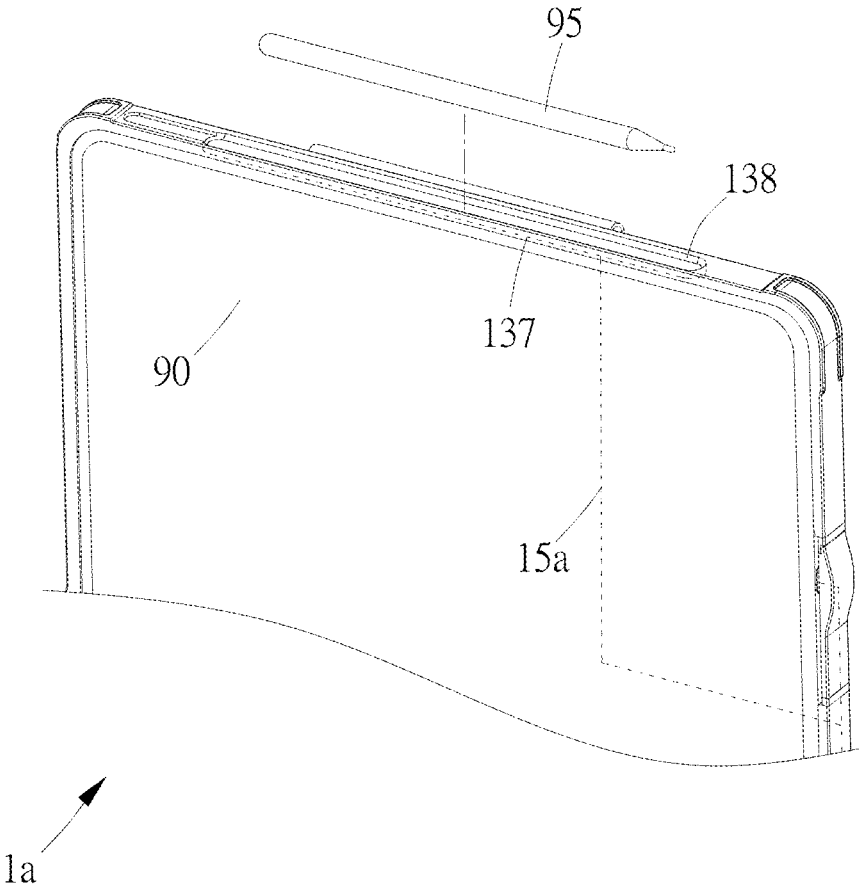
FIG. 6 is a partial schematic diagram of the touch pen, tablet computer, and tablet computer protective case device according to the second embodiment of the present invention.
Figure 7:
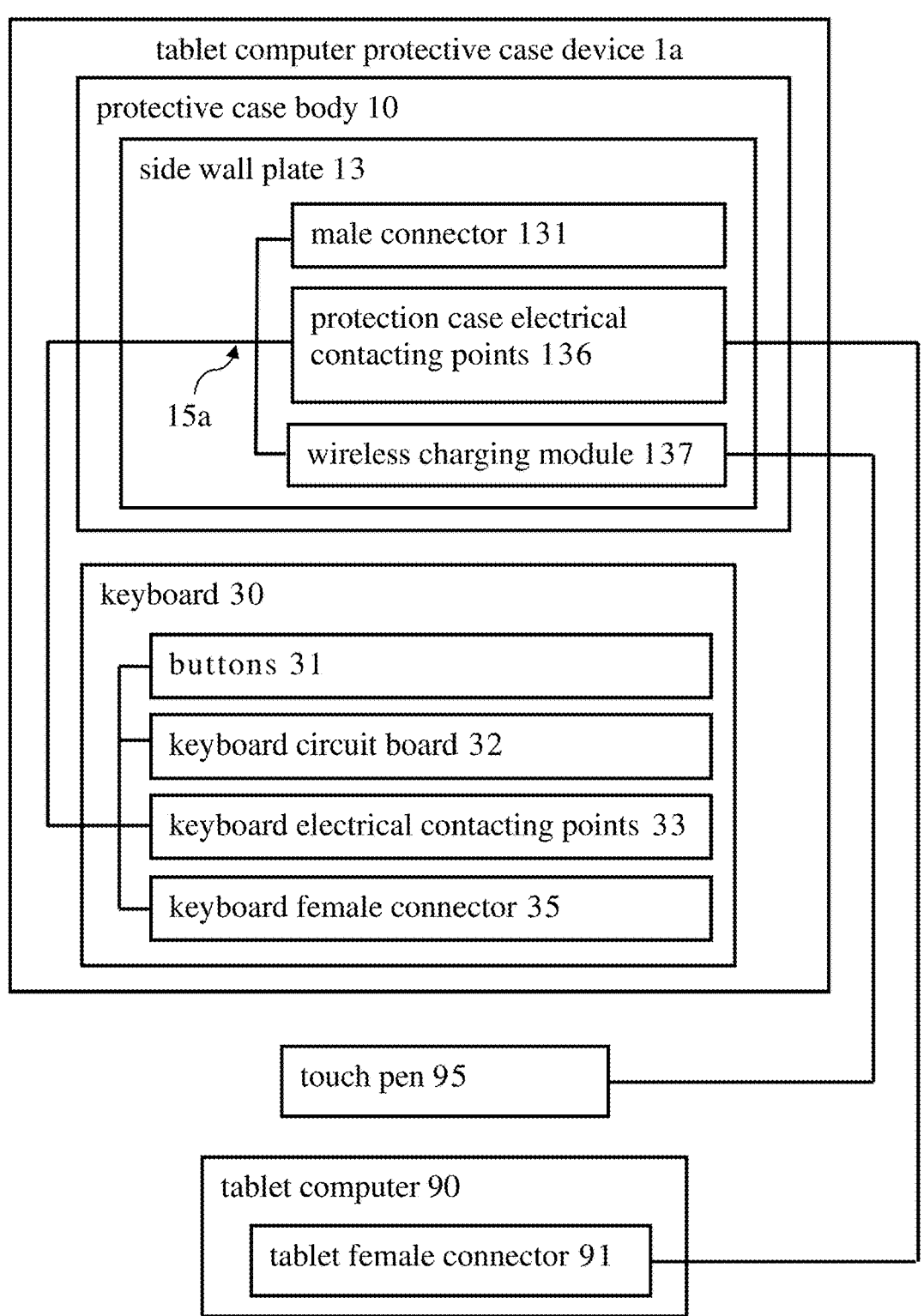
FIG. 7 is a system structure diagram of the touch pen, tablet computer, and tablet computer protective case device according to the second embodiment of the present invention.

With reference to FIGS. 6 to 7, which illustrate the tablet computer protective case device according to the second embodiment of the present invention. FIG. 6 is a partial schematic diagram of the touch pen, tablet computer, and tablet computer protective case device according to the second embodiment of the present invention. FIG. 7 is a system structure diagram of the touch pen, tablet computer, and tablet computer protective case device according to the second embodiment of the present invention.

As shown in FIG. 6 and FIG. 7, the difference between the second embodiment and the first embodiment is that, in the tablet computer protective case device 1a of the second embodiment, the side wall plate 13 further includes a wireless charging module 137 and a touch pen holder 138. The wireless charging module 137 is electrically connected to the conductive connecting wire 15a set inside the main plane plate. The wireless charging module 137 is used for wireless charging of nearby objects. The touch pen holder 138 is a groove, and the touch pen holder 138 is located on the outer side of the wireless charging module 137, which means that the wireless charging module 137 is located at the bottom of the groove of the touch pen holder 138. The touch pen holder 138 is used for accommodating a touch pen 95. Through the aforementioned structure, when the touch pen 95 is placed in the touch pen holder 138, the wireless charging module 137 can perform wireless charging for the touch pen 95.

Via the structure design of the tablet computer protective case device 1, 1a of the present invention, the tablet computer can be connected to the keyboard via a wired method, and the keyboard can obtain power from the tablet computer via the wired method, without the need to set up additional power sources, thereby achieving the effect of cost savings. Additionally, in the prior art, some tablet computers have wireless charging modules, but the wireless charging modules are designed to sense the chip of the nearby touch pen to determine whether it is a specific brand and to only charge the touch pen of the specific brand wirelessly. However, via the design of the touch pen holder and wireless charging module of the tablet computer protective case device of the present invention, the wireless charging module can charge any brand of touch pen placed in the touch pen holder wirelessly, thereby avoiding the issue of charging only the touch pen of a specific brand in the prior art and providing good convenience.

It should be noted that the above is merely an embodiment and not limited to an embodiment. The scope of the claims of the present patent shall prevail. For example, the tablet computer protective case device 1 may also not include the keyboard 30.

What is claimed is:

1. A tablet computer protective case device, used for accommodating a tablet computer, wherein the tablet computer comprises a tablet female connector, the tablet computer protective case device comprising:

a protective case body, comprising:

a main plane plate;

a side wall plate, connected to the main plane plate around, wherein the side wall plate comprises a male connector a gap and a plurality of protection case electrical contacting points, the male connector is used for connecting to the tablet female connector, the gap is located next to the male connector, allowing the side wall plate to form a connection strip, the plurality of protection case electrical contacting points are located on a bottom side of the side wall plate;

a conductive connecting wire, used for connecting to the male connector;

an accommodation space, formed by the main plane plate and the side wall plate, to accommodate the tablet computer; and a keyboard, comprising a plurality of buttons, a keyboard circuit board and a plurality of keyboard electrical contacting points, wherein the plurality of buttons are electrically connected to the keyboard circuit board, the plurality of keyboard electrical contacting points are electrically connected to the keyboard circuit board;

wherein one opening end of the connection strip is connected to the male connector, allowing the male connector to be inserted into the tablet female connector or for the male connector to be separated from the tablet female connector through the connection strip;

wherein the plurality of protection case electrical contacting points are electrically connected to the conductive connecting wire; whereby, allowing the plurality of protection case electrical contacting points to be electrically connected to the plurality of keyboard electrical contacting points, allowing the keyboard to be connected to the tablet computer via a wired method.

2. The tablet computer protective case device as claimed in claim 1, wherein the keyboard further comprises a keyboard female connector, and the keyboard female connector is electrically connected to the keyboard circuit board.

3. The tablet computer protective case device as claimed in claim 2, wherein the keyboard female connector and the tablet female connector belong to the same type of female connector.

4. The tablet computer protective case device as claimed in claim 3, wherein the keyboard female connector and the tablet female connector are TYPE-C female connectors.

5. The tablet computer protective case device as claimed in claim 1, wherein the side wall plate further comprises a wireless charging module, and the wireless charging module is electrically connected to the conductive connecting wire.

6. The tablet computer protective case device as claimed in claim 5, wherein the side wall plate further comprises a touch pen holder, and the touch pen holder is located on an outer side of the wireless charging module; whereby, the touch pen holder is used for storing a touch pen, and when the touch pen is placed in the touch pen holder, a wireless charging is performed.

7. The tablet computer protective case device as claimed in claim 1, wherein the side wall plate further comprises a wireless charging module, and the wireless charging module is electrically connected to the conductive connecting wire.

8. The tablet computer protective case device as claimed in claim 7, wherein the side wall plate further comprises a touch pen holder, and the touch pen holder is located on an outer side of the wireless charging module; whereby, the touch pen holder is used for storing a touch pen, and when the touch pen is placed in the touch pen holder, a wireless charging is performed.

* * * * *